United States Patent
Haw et al.

(10) Patent No.: US 9,228,878 B2
(45) Date of Patent: Jan. 5, 2016

(54) DUAL BEAM NON-CONTACT DISPLACEMENT SENSOR

(75) Inventors: Thomas Haw, Portland, OR (US); Gary Kercheck, Portland, OR (US)

(73) Assignee: Advanced Energy Industries, Inc., Fort Collins, CO (US)

( * ) Notice: Subject to any disclaimer, the term of this patent is extended or adjusted under 35 U.S.C. 154(b) by 838 days.

(21) Appl. No.: 13/424,262

(22) Filed: Mar. 19, 2012

(65) Prior Publication Data

US 2013/0245996 A1     Sep. 19, 2013

(51) Int. Cl.
*G01F 23/292* (2006.01)

(52) U.S. Cl.
CPC .................... *G01F 23/292* (2013.01)

(58) Field of Classification Search
CPC ... G01F 23/292; G01F 23/0076; G01F 23/22; G01F 23/0061; G01F 23/2928; G01N 21/4795; G01N 2035/1025; G01N 21/3581; G01N 21/43; G01B 9/02014; G01B 9/02091; H01S 3/0057
USPC ............. 250/577; 356/625; 73/293; 359/515; 372/25
See application file for complete search history.

(56) References Cited

U.S. PATENT DOCUMENTS

| | | | | |
|---|---|---|---|---|
| 4,429,995 | A * | 2/1984 | Goulas | 356/343 |
| 4,733,095 | A * | 3/1988 | Kurahashi et al. | 250/577 |
| 5,419,277 | A * | 5/1995 | Urano et al. | 117/201 |
| 6,186,004 | B1 * | 2/2001 | Kaduchak et al. | 73/596 |
| 2003/0116729 | A1 * | 6/2003 | Moriya et al. | 250/577 |
| 2003/0149346 | A1 | 8/2003 | Arnone et al. | |
| 2004/0233944 | A1 | 11/2004 | Comstock et al. | |
| 2005/0285060 | A1 | 12/2005 | Haga et al. | |
| 2006/0002594 | A1 * | 1/2006 | Clarke et al. | 382/120 |
| 2008/0285602 | A1 * | 11/2008 | Nagai et al. | 372/20 |
| 2010/0044353 | A1 | 2/2010 | Olsen | |
| 2010/0232459 | A1 * | 9/2010 | Hashimoto et al. | 372/25 |
| 2011/0063628 | A1 | 3/2011 | Xie et al. | |
| 2011/0085573 | A1 * | 4/2011 | Bartels et al. | 372/25 |
| 2014/0036942 | A1 * | 2/2014 | Vander et al. | 372/25 |

OTHER PUBLICATIONS

Davidson et al., Digital Imaging in Optical Microscopy, Molecular Expression, 1998, pp. 4-5.*
Letokhov et al., Advances in Laser Physics, Harwood Academic Publishers, 2000, p. 63.*
Pastorius, Triangulation Sensors, Instrument Soc Amer, 2001, pp. 5-6.*
Selby, Standard Mathematical Tables, The Chemical Rubber Co., 1968, p. 179.*
Copenheaver, Blaine R., "International Search Report and Written Opinion re Application No. PCT/US2013/032837", Jun. 14, 2013, p. 11 Published in: US.

(Continued)

*Primary Examiner* — Sujoy Kundu
*Assistant Examiner* — Lisa Peters
(74) *Attorney, Agent, or Firm* — Neugeboren O'Dowd PC

(57) ABSTRACT

This disclosure describes systems, methods, and apparatus for remotely monitoring an elevation, or change in elevation, of a fluid surface, such as that of molten sapphire. The remote monitoring can be performed by measuring positions of a pair of reflected laser beams off the fluid surface as detected on an imaging sensor. As the surface elevation falls, the positions of the pair of reflected laser beams move relative to each other, and this positional change can be converted into a change in the fluid surface elevation.

29 Claims, 11 Drawing Sheets

(56) References Cited

OTHER PUBLICATIONS

Jones, Chris, "Non-contact displacement sensor technologies", Power in Motion, Oct. 2008, pp. 12-13, Publisher: Microepsilon, Published in: GB.

Wikipedia, "Operation Chastise", Webpage found at http://en.wikipedia.org/wiki/Operation_Chastise downloaded Jan. 17, 2013, last modified Jan. 13, 2013, p. 15 Publisher: Wikipedia Foundation, Inc., Published in: US.

Winkler, Erich, "New laser triangulation sensors: Blue light for glowing materials", on Focus: Sensors, Mar. 2011, p. 14 Publisher: Microepsilon DE.

Wittmann-Regis, Agnes, "International Preliminary Report on Patentability re Application No. PCT/US2013/032837", Oct. 2, 2014, p. 9 Published in: CH.

* cited by examiner

Asynchronous

Synchronous

DUAL BEAM NON-CONTACT DISPLACEMENT SENSOR

FIELD OF THE DISCLOSURE

The present disclosure relates generally to remote sensing. In particular, but not by way of limitation, the present disclosure relates to systems, methods and apparatuses for remotely sensing a height of a fluid.

BACKGROUND

Multiple variations on sapphire ingot growth (e.g., the Kyropoulos, Czochralski, Bagdasarov methods) involve crystallization on a sapphire seed within a crucible where molten sapphire is formed. In various growth methods an accurate knowledge of the volume of remaining molten sapphire is essential and can be ascertained via knowledge of the level or height of the fluid. For instance, since sapphire crystal is denser than the molten fluid, as the fluid crystallizes, the fluid level recedes, and the ability to monitor this changing level allows an inferred measurement of crystal growth rate.

Prior methods have used single-beam triangulation to measure the fluid level (see FIG. 1), but are difficult, if not impossible, to implement due to the requirement of a large angle (e.g., 20°) between the beam source and beam detector (e.g., MICRO-EPSILON's OPTONCDT). The chambers in which sapphire is melted can reach 2050° C., and in order to maintain such temperature, thick crucible walls are often used, allowing only a single long and narrow view corridor (or window) into the crucible. The ~20° angle required by these methods is incompatible with such a long and narrow tube.

FIG. 1 illustrates a traditional single-beam triangulation system for remote displacement sensing. A vessel 102 contains a liquid 103 existing at a first level 104, and then at a second level 106. A single-beam triangulation-based displacement monitor 108 uses a laser source 110 to project an incident beam 112 onto the first and second surfaces 104, 106 of the liquid 103. A reflection 114 from the first level 104 is measured by a sensor 116 and the reflection 114 from the second level 104 is measures by the sensor 116. Based on the distance 120 between the positions of the reflected beams 114, 118 on the sensor 116, a distance 122 between the levels 104, 106 can be calculated. However, this system is generally inoperable in sapphire growth furnaces since displacement measurements typically are made through a narrow and elongated view corridor 202 as illustrated in FIG. 2, and the angle between the beams is typically greater than allowable through the narrow and elongated view corridor 202.

While some systems can make remote displacement measurements using smaller incident angles, and are thus compatible with the narrow and elongated view corridor 202 of a furnace 200, such systems typically do not achieve desired height resolutions for the fluid surface. These systems often use a single beam reflected off the molten sapphire fluid surface, and measure fluid height changes as a function of change in reflected beam position on a CCD. The reason such systems achieve low resolution is that a number of variables, other than movement in the elevation of the fluid level, lead to movements in the reflected beam position. Vibrations of the crucible, misalignment of the laser source, and fluctuations in the fluid surface can all cause the reflected beam to jitter across the CCD even where no change in the fluid level occurs. Furthermore, reasonably-priced CCD's are generally two-dimensional pixel arrays capable of no more than around 70 Hz refresh rates, and as a result, the rapid movements of the reflected beam are often detected as blurs rather than as ideal Gaussian circles or ellipses. All of these factors make accurate and highly resolved measurements of the fluid level difficult.

A further problem with the systems of the prior art is that the laser reflection is often overshadowed by the blackbody radiation of the over 2000° C. molten sapphire. The CCDs used in the art tend to saturate when sapphire reaches 1200° C., thus having very high signal to noise ratios long before the sapphire reaches its melting temperature.

One solution to this problem has been to use lasers operating at wavelengths where there is less blackbody intensity from the molten sapphire (e.g., blue such as MICRO-EPSILON's OPTONCDTBL). However, even when using short wavelength lasers, the CCD's tend to saturate above 1200° C.

Another attempted solution is the use of confocal displacement sensors, which use multiple frequencies of light focused at different distances to make nanometer resolution high refresh rate displacement measurements, but such devices are limited in range (e.g., MICRO-EPSILON'S CONFOCALDT has a maximum range of 24 mm). Confocal sensors are typically not applicable to molten sapphire measurements since the crucible design often requires that the sensor be around 1.5 m from the fluid surface.

SUMMARY OF THE DISCLOSURE

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Some embodiments of the disclosure may be characterized as a remote displacement sensing system for fluid level measurement. The system may include a one-dimensional imaging sensor, a first laser source, a second laser source, and a processor. The first laser source can be directed to a fluid surface within a furnace such that a first reflected beam is detected by the one-dimensional imaging sensor at a first position. The second laser source can be directed to the fluid surface within the furnace such that a second reflected beam is detected by the one-dimensional imaging sensor at a second position. The processor can be configured to monitor a distance between the first and second positions and to calculate a change in a level of the fluid based on a change in the distance between the first and second positions.

Other embodiments of the disclosure may also be characterized as a method of performing remote displacement sensing of a fluid surface. The method can include directing a first laser beam to pass through a view corridor of a furnace, reflect off a fluid surface inside the furnace, and return through the view corridor. The method further can include directing a second laser beam to pass through the view corridor of the furnace, reflect off the fluid surface of the inside of the furnace, and return through the view corridor. The method also can include measuring, via at least one imaging sensor, a first average distance between the first and second laser beams during a first time period. The method further can include measuring, via the at least one imaging sensor, a second average distance between the first and second laser beams during a second time period. The method also can include calculating, via a processor, a difference between the first and second average distances. Finally, the method can include determining, via the processor, a change in elevation of the fluid surface as a function of the difference.

Other embodiments of the disclosure can be characterized as a remote displacement sensing system comprising an imaging sensor, a first pulsed laser source, a second pulsed laser source, and a processor. The imaging sensor can have a discontinuous detection integration period. The first pulsed laser source can be directed to a fluid surface within a furnace such that a first reflected beam is detected by the imaging sensor at a first position. The pulses of the first pulsed laser source can have a pulse length such that blurring of the first position on the imaging sensor is reduced. The second pulsed laser source can be directed to the fluid surface within the furnace such that a second reflected beam is detected by the imaging sensor at a second position. The pulses of the second pulsed laser source can have a pulse length such that blurring of the second position on the imaging sensor is reduced. Lastly, the processor can be configured to monitor a distance between the first and second positions and to calculate a level of the fluid based on the distance between the first and second positions.

Further embodiments, of the disclosure can be characterized as a non-transitory, tangible computer readable storage medium, encoded with processor readable instructions to perform a method for remotely measuring a vertical displacement of a surface of fluid. The method can include detecting a first position of a first reflected laser beam at a first time. Detecting a second position of a second reflected laser beam at the first time. Further, calculating a second position of a second reflected laser beam at the first time. Calculating a first distance between the first and second positions. Detecting a third position of the first reflected laser beam at a second time. Also, detecting a fourth position of the second reflected laser beam at the second time. Additionally, calculating a second distance between the third and fourth positions and calculating a change in reflected laser beam separation as the second distance minus the first distance. Lastly, calculating the vertical displacement of the surface of the fluid as the change in reflected laser beam separation divided by four times a tangent of an incident angle of either of the first or second laser beams.

BRIEF DESCRIPTION OF THE DRAWINGS

Various objects and advantages and a more complete understanding of the present invention are apparent and more readily appreciated by referring to the following detailed description and to the appended claims when taken in conjunction with the accompanying drawings:

DETAILED DESCRIPTION

The word "exemplary" is used herein to mean "serving as an example, instance, or illustration." Any embodiment described herein as "exemplary" is not necessarily to be construed as preferred or advantageous over other embodiments.

In some embodiments, the systems, methods, and apparatus herein disclosed, overcome the challenges of the art via any one or more of the following (1) measuring movement of a first beam relative to a second beam, where both beams are reflected off the fluid surface to be measured, (2) measuring the reflected beams using a one-dimensional imaging sensor rather than a two-dimensional sensor, (3) spreading the beams into elongated shapes perpendicular to the orientation of the line scanner, (4) pulsing the laser source and optionally the one-dimensional imaging sensor, and/or (5) filtering the light that reaches the imaging sensor.

Use of Two Laser Beams

Figure 1:
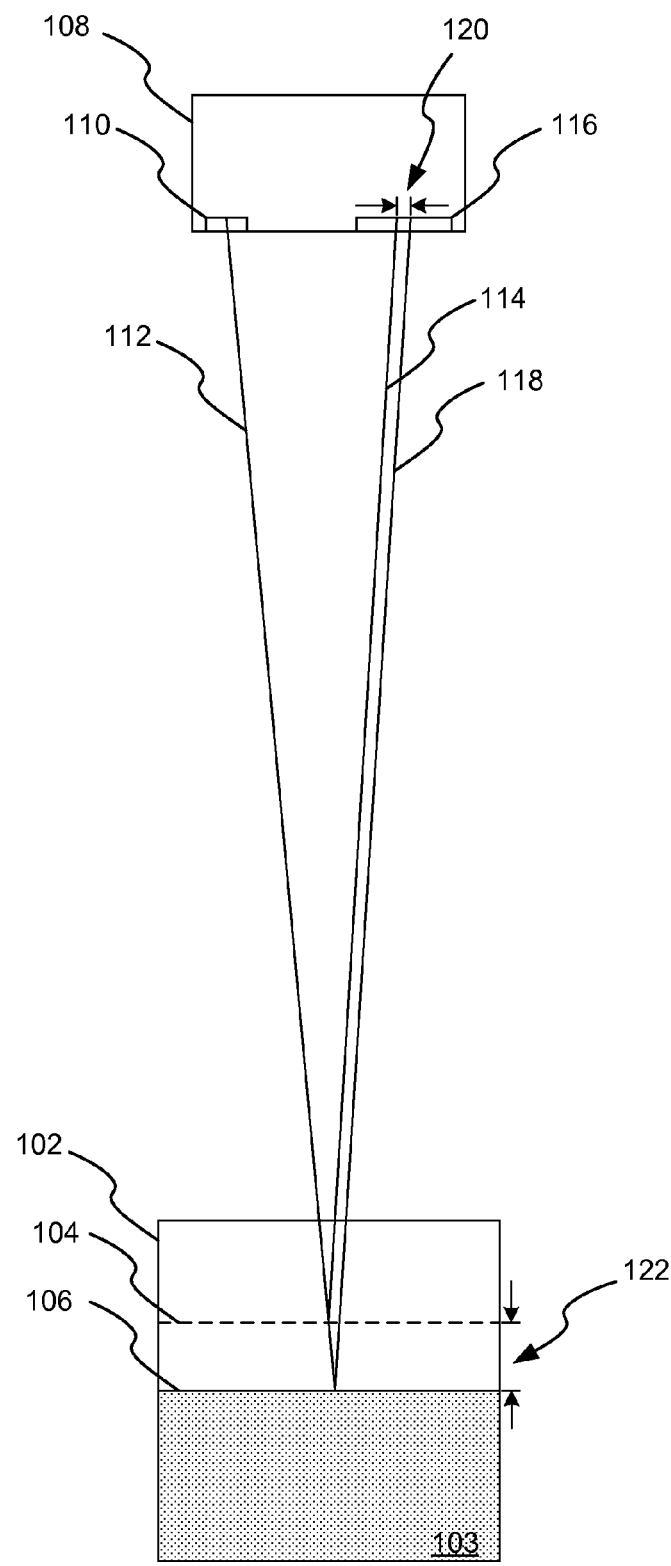
FIG. 1 illustrates a traditional single-beam triangulation system for remote displacement sensing.
Figure 2:
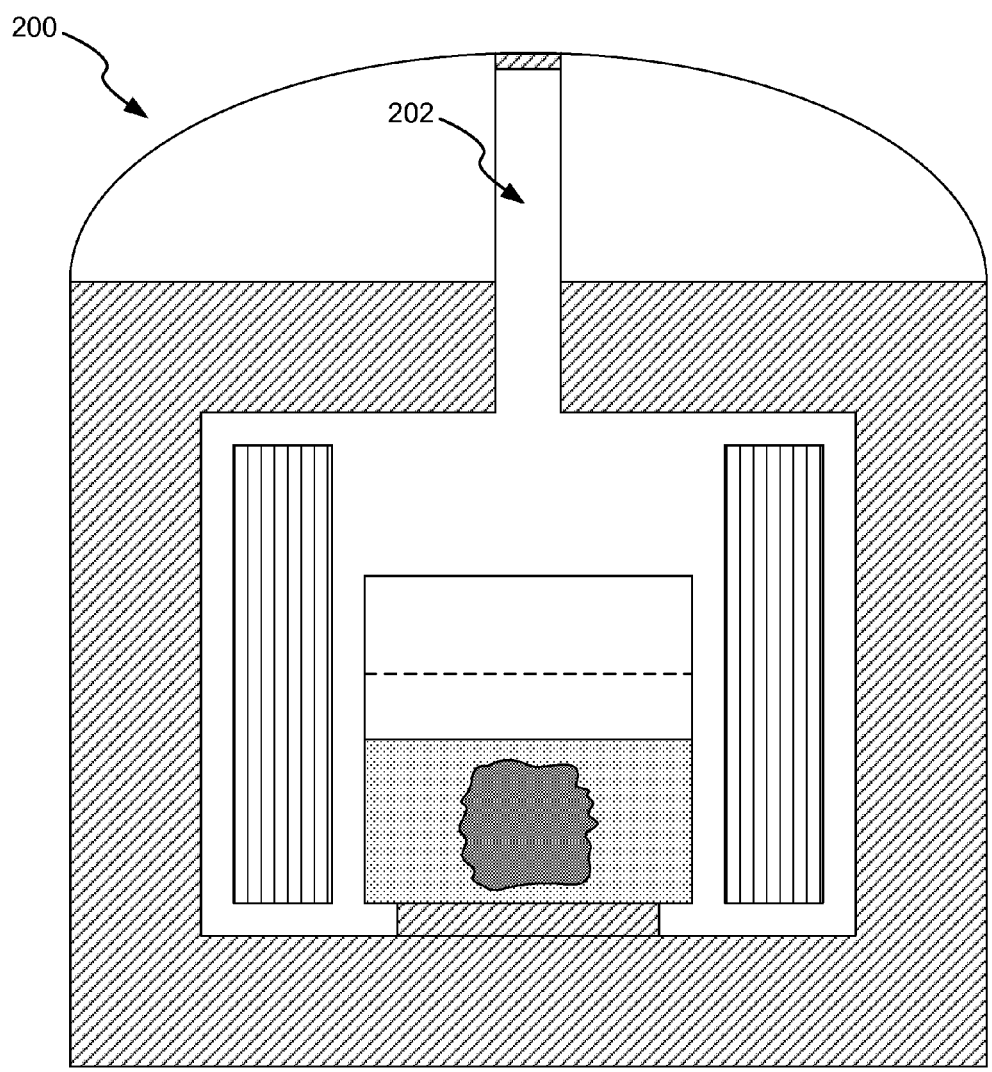
FIG. 2 illustrates a typical furnace used to grow sapphire crystals from molten sapphire.
Figure 3:
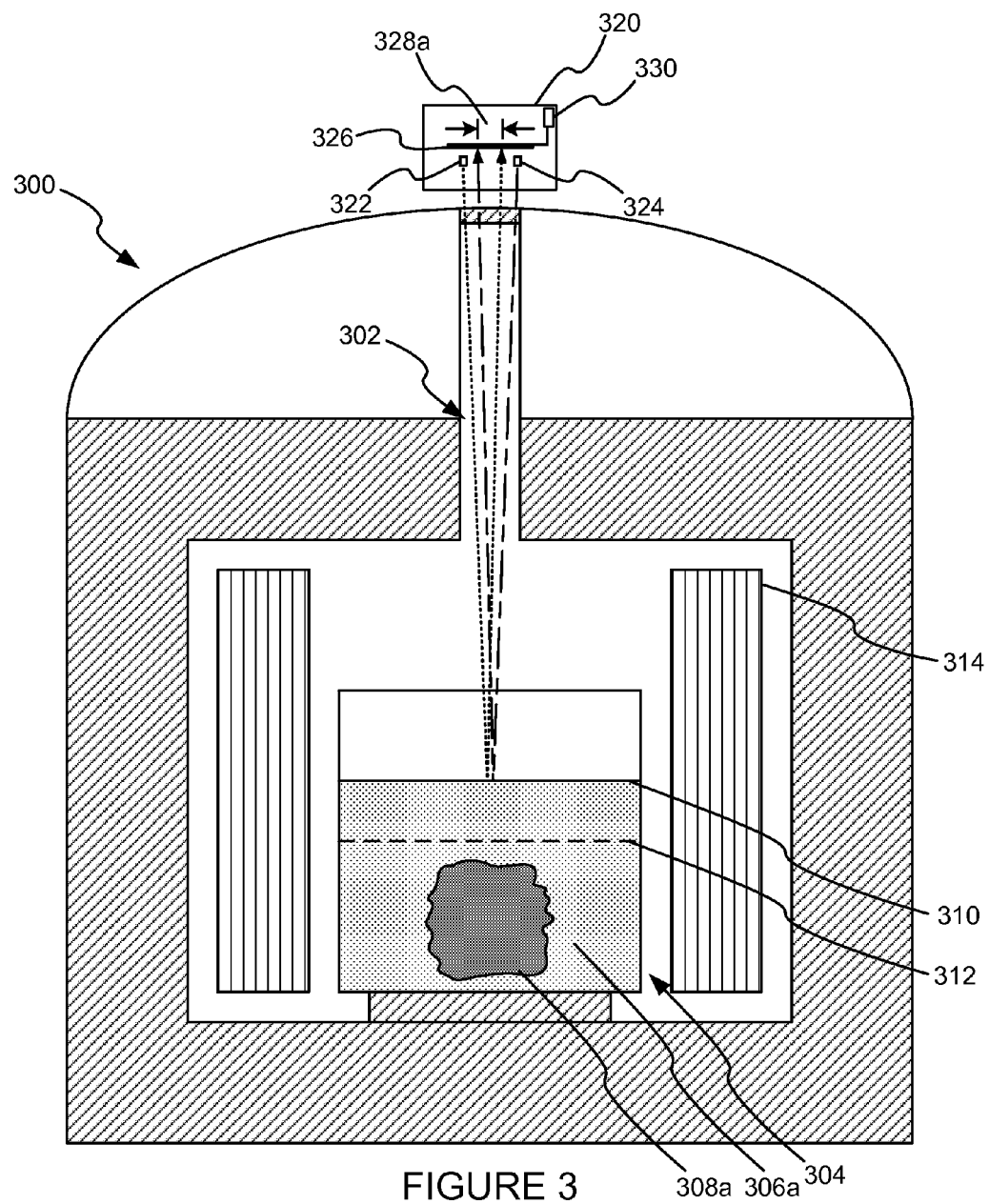
FIG. 3 illustrates one embodiment of an apparatus for remotely monitoring displacement of a fluid.

FIG. 3 illustrates one embodiment of an apparatus 320 for remotely monitoring displacement of a fluid. In particular, the apparatus 320 has application in remotely monitoring displacement of a fluid, or a reflective fluid, or a specularly reflective fluid, or a molten liquid, or molten materials such as sapphire, silicon, silicon carbide, and glass, to name a few. The apparatus 320 also has application to any remote displacement measurement of a fluid surface where the fluid is at higher-than atmospheric temperatures or in chemically or thermally hostile environments. Said fluids include viscous and semifluid liquids as well as mixtures comprising gas-liquid combinations.

The measurements are remote since the surfaces 310, 312 to be measured may be within a furnace or crucible 300. Such a furnace 300 may be used to heat or melt a substance, for instance when growing sapphire crystal. In such an embodiment, heating elements 314 can be used to heat the fluid 306a and in some cases to melt a substance to form the fluid 306a, from which a crystal 308a can grow (e.g., a sapphire, silicon, or silicon carbide crystal). The furnace 300 can include a narrow and elongated view corridor 302, which may provide the lone visual access to the molten fluid 306a. The fluid 306a resides in a vessel 304 and has a first surface 310 that exists when the crystal 308a has a first size. As the crystal 308a grows it converts the fluid 306a into a solid, thus causing an elevation of the first surface 310 to drop to the second surface 312 (and illustrated in FIG. 4).

The apparatus 320 can be arranged external to the furnace 300 and can include at least a first laser source 322, a second laser source 324, an imaging sensor 326, and a processor 330 coupled to the imaging sensor 326. The first and second laser sources 322, 324 are the starting points or emission points for a first laser beam and a second laser beam, respectively. The first and second laser beams are directed at the first surface 310 of the fluid 306a through the narrow and elongated view corridor 302. The first and second laser beams reflect off the first surface 310 as first and second reflected laser beams, and these reflected laser beams are incident on, and detected by, the imaging sensor 326. The first reflected laser beam can be detected at a first reflected laser beam position (e.g., one or more pixels locations) and the second laser beam can be detected at a second reflected laser beam position. The first and second laser beam positions can be passed to the processor 330, which can determine a first distance 328a between the first and second reflected laser beam positions.

Figure 4:
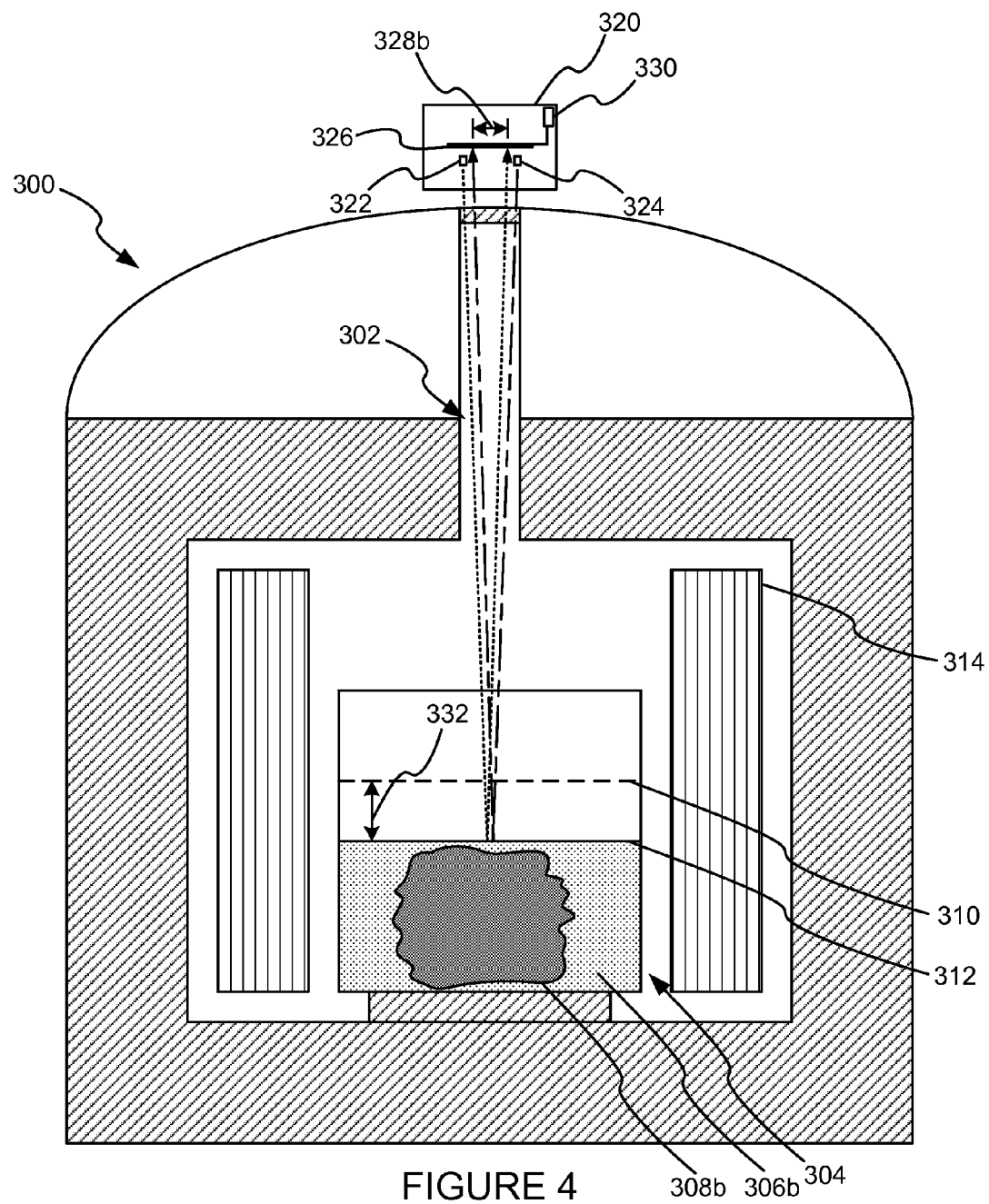
FIG. 4 illustrates the apparatus of FIG. 3 at a subsequent time in which an elevation of the fluid has decreased.

As illustrated in FIG. 4, when the crystal 308b grows, the volume of fluid 306b decreases and the second surface 312 becomes a top surface of the fluid 306b—in other words, the surface elevation of the fluid 306a, 306b changes from 310 to 312. The first and second laser beams travel a further distance before reflection than they did when reflecting off the first surface 310, and thus impinge on the imaging sensor 326 at different positions. The imaging sensor 326 can detect a position of the first reflected laser beam and pass this position to the processor 330 as a third reflected laser beam position. The imaging sensor 326 can also detect a position of the second reflected laser beam and pass this position to the processor 330 as a fourth reflected laser beam position. Based on the third and fourth reflected laser beam positions, the processor 330 can determine a second distance 328b between the third and fourth reflected laser beam positions. The processor 330 can use the difference between the first and second distances 328a, 328b, along with an angle of incidence (e.g., 0.5°-1.5°) of either of the first or second laser beams relative to the imaging sensor 326, to determine a change in elevation 332 of the fluid 306b from first surface 310 to second the surface 312.

The use of two laser beams enables a smaller angle of incidence (angle between beams and fluid surface 310, 312 or between beams and imaging sensor 326) than is possible in the art (e.g., 0.5°-1.5°), thus enabling the apparatus 320 to perform remote displacement sensing of the fluid 306b first and second surfaces 310, 312, through the narrow elongated view corridor 302. As such, laser source to fluid surface distances can include 1 meter, 1.25 meters, 1.5 meters and other distances over which such displacement measurements are ineffective in the prior art. Making measurements using two beams also allows accurate remote displacement measurements even where misalignment between the first and second laser beam sources 322, 324, and/or the imaging sensor 326 occurs, or where ripples or other perturbations in the surface of the fluid 306b would otherwise throw off a single-beam system. Since changes in reflected laser beam position are measured relative to a second reflected laser beam, either beam acts as the reference rather than a point on the image sensor.

The first laser source 322 is an emission aperture for a first laser and the second laser source 324 is an emission aperture for a second laser. These emission apertures can be apertures of the lasers or the lasers can be remote from the first and second laser sources 322, 324. In such embodiments, optical paths such as fiber optics or a system of one or more reflective surfaces (e.g., mirrors) can transfer the laser light from the lasers to the first and second laser sources 322, 324.

One of skill in the art will recognize that the first and second laser beams can be one continuous wave laser beam, or two separate pulses. In either case, the source and beam direction are the same; the reference to a first and second beam was merely used to help delineate the beam path at a first time and the beam path at a subsequent time.

Figure 5A:
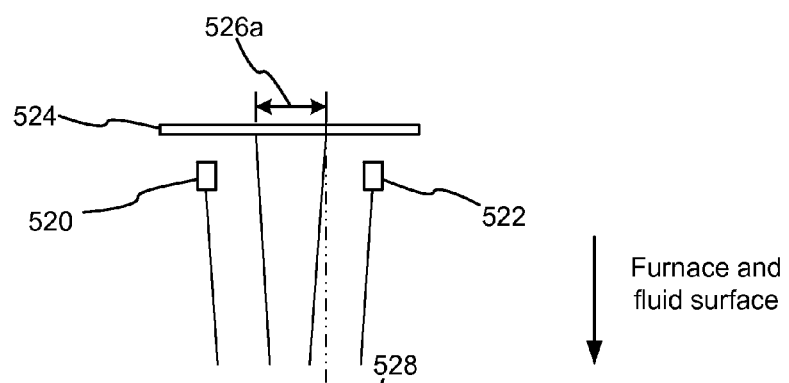
FIG. 5A shows the laser beams and reflected beams for a first fluid surface.
Figure 5B:
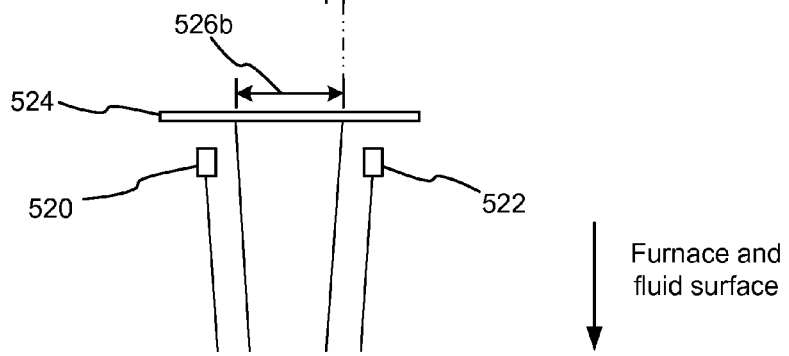
FIG. 5B shows the same laser beams and reflected beams when the fluid surface elevation has dropped.

FIGS. 5A and 5B illustrate close ups of laser sources 520, 522 and an imaging sensor 524 showing how a change in a distance 526a 526b between reflected laser beams can be measured. FIG. 5A shows the laser beams and reflected beams for a first fluid surface (not illustrated), and FIG. 5B shows the same laser beams and reflected beams when the fluid surface elevation has dropped (as the crystal expands and consumes fluid). As seen, the first distance 526a, is smaller than the second distance 526b. A difference between the first and second distances 526a, 526b can be a third distance 528. The third distance can be used to calculate a change in the elevation of the fluid surface as discussed below with reference to FIG. 6.

Figure 6:
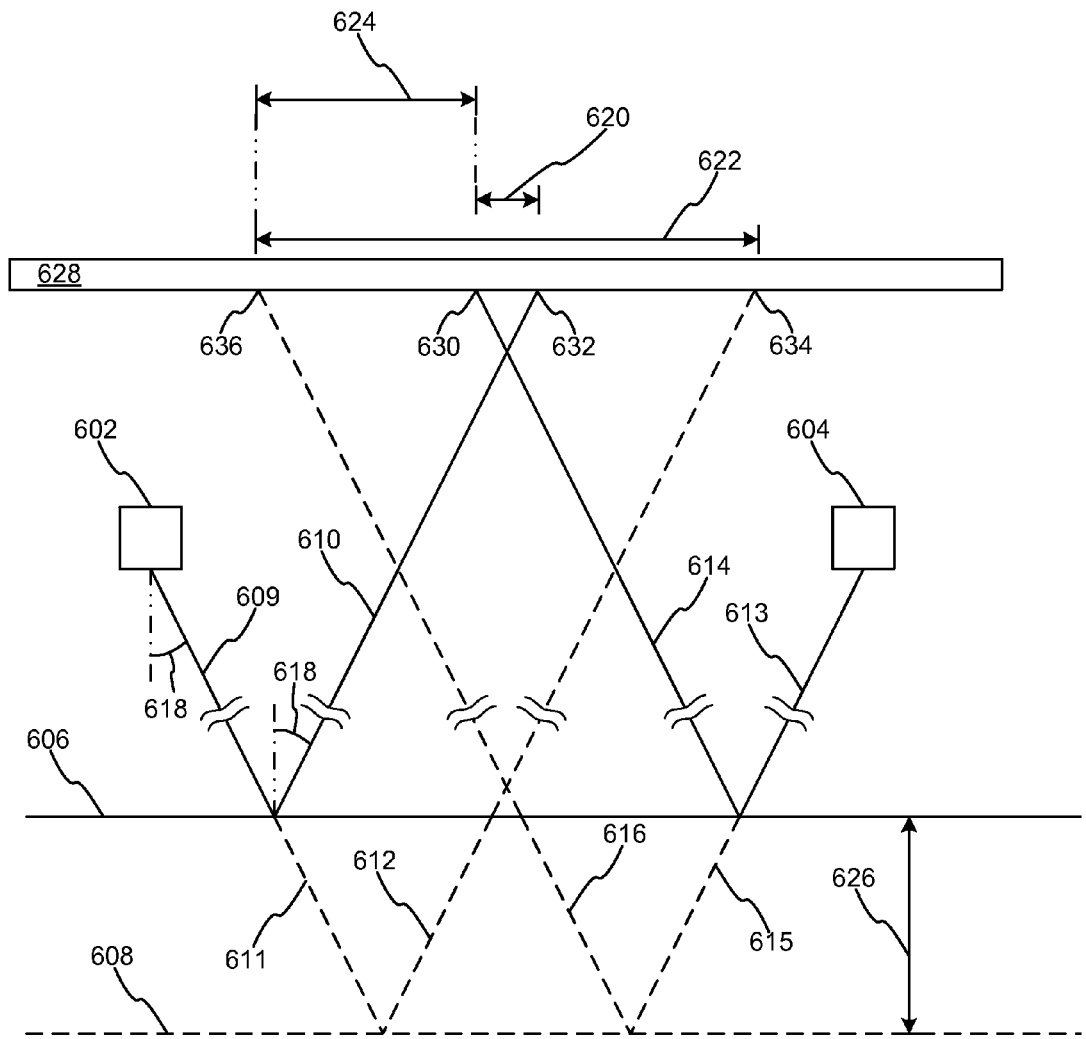
FIG. 6 illustrates components and measurements used to remotely monitor displacement of a fluid surface.

FIG. 6 illustrates components and measurements used to remotely monitor displacement of a fluid surface. FIG. 6 is not drawn to scale, but rather includes exaggerated angles and proportions in order to aid in visualization of the measurement scheme. Illustrated are, a first laser source 602, a first laser beam 609, a first reflected laser beam 610, a third laser beam 611, a third reflected laser beam 612, a second laser source 604, a second laser beam 613, a second reflected laser beam 614, a fourth laser beam 615, a fourth reflected laser beam 616, an imaging sensor 628, a first fluid surface 606, a second fluid surface 608, and various distances and angles.

The first laser source 602 emits the first laser beam 609 at an incident angle 618 (relative to a perpendicular to the fluid surface 606, 608), while a second laser source 604 emits the second laser beam 613 at the incident angle 618 or a similar angle. The first and second laser beams 609, 613 pass into the furnace (not illustrated) and reflect off the first surface 606 of the fluid generating the first and second reflected laser beams 610, 614. The first and second reflected laser beams 610, 614 intercept the imaging sensor 628 at a first intercept position 630 and a second intercept position 632. The first and second laser beams 609, 613 can be emitted at a first time, the corresponding reflected laser beams 610, 614 can be detected by the imaging sensor 628 at just a moment later.

The imaging sensor 628 can pass data indicating the first and second intercept positions 630, 632 to a processor, which can determine a first distance 620 between the first and second intercept positions 630, 632.

The elevation of the first surface 606 of the fluid can decrease to that of the second surface 608 as the crystal grows. At a second time, when the surface elevation is at the second surface 608, the first laser source 602 can emit a third laser beam 611, causing a third reflected laser beam 612 from the second surface 608 to reflect up out of the furnace and impact the imaging sensor 628 at a third intercept position 634. At the second time, the second laser source 604 can emit a fourth laser beam 615 causing a fourth reflected laser beam 616 to reflect and impact the imaging sensor 628 at a fourth intercept position 636.

The imaging sensor 628 can provide the third and fourth intercept positions 634, 636 to the processor (e.g., processor 330 in FIGS. 3 and 4), which can determine a second distance 622 between the third and fourth intercept positions 634, 636.

The processor can further subtract the first distance 620 from the second distance 622 to determine a change in distance 624 between the first and second distances 620, 622.

This change in distance 624 can be used, along with the incident angle 618 to determine a displacement 626 in the fluid surface elevation. In particular, the displacement 626 can be solved via Equation 1 as follows:

$$\Delta_{626} = \frac{\Delta_{624}}{4\tan(\emptyset)} \quad (1)$$

In Equation 1, $\Delta_{626}$ is the displacement 626, $\Delta_{624}$, is the change in distance 624, and $\theta$ is the incident angle 618. It should be noted, that use of a larger angle 618 $\theta$ can result in higher resolution remote sensing of the fluid surface displacement. At the same time, it may be easier to resolve changes in reflected laser beam position on the imaging sensor where the angle 618 $\theta$ is larger since $\Delta x/\Delta z \sim 2\theta$. Angle 618 $\theta$ can include, but is not limited to all angles between 0° and 90°, and especially 0.5°-1.5°.

In some embodiments, the incident angle 618 can be different for the first and second laser sources 602, 604. Differences in the incident angles, allow algorithms to account for disturbances in the fluid surface that would otherwise result in inaccurate determinations of the surface elevation.

One of skill in the art will recognize that the first and second laser beams can be one continuous wave laser beam, or two separate pulses. In either case, the source and beam direction are the same; the reference to a first and second beam was merely used to help delineate the beam path at a first time and the beam path at a subsequent time.

Figure 11:
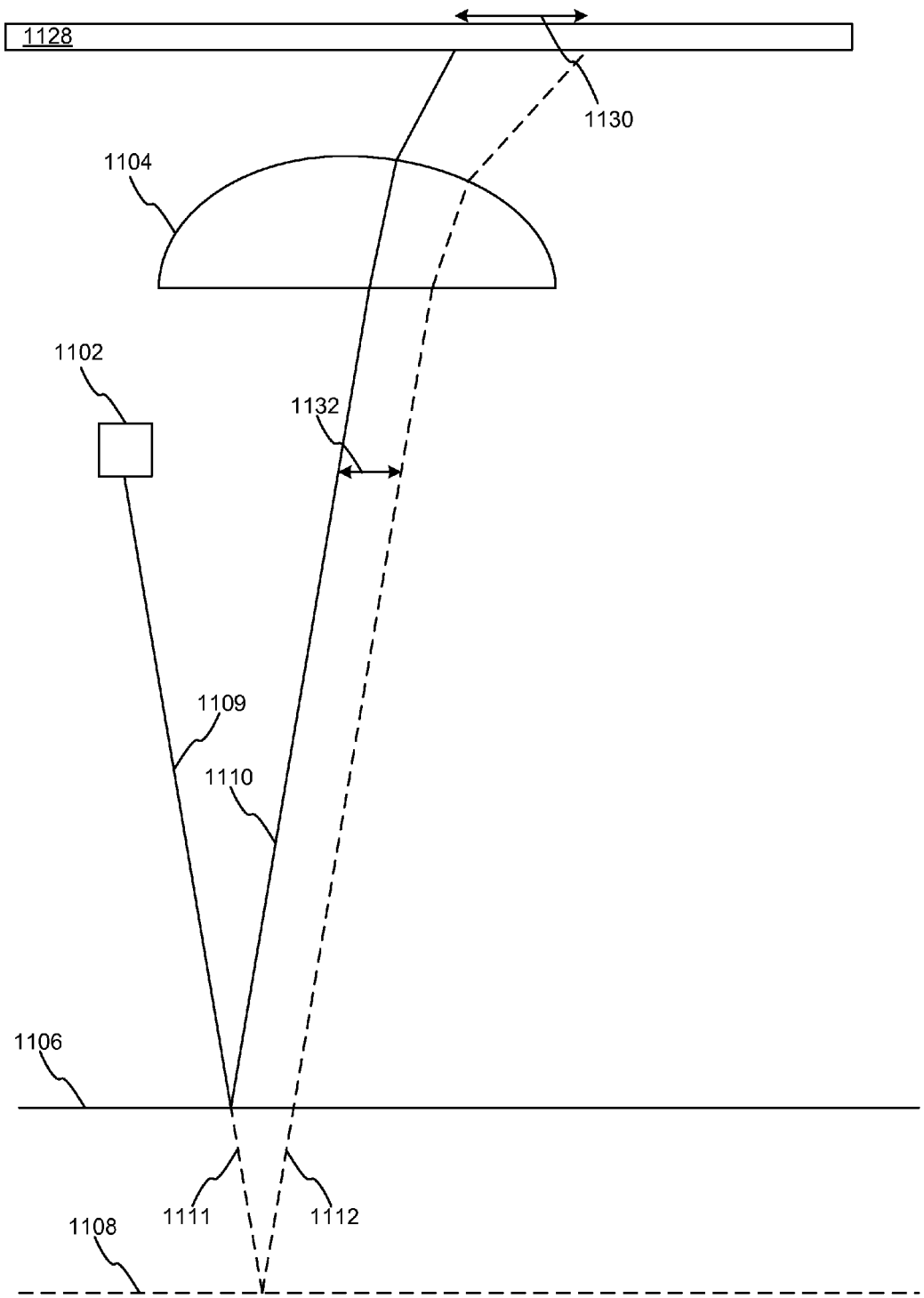
FIG. 11 illustrates an embodiment of a remote displacement monitoring system using a lens element to improve resolution.

In some embodiments lenses or other beam shaping elements can be used to further improve resolution. For instance, passing the reflected beams through a convex lens before they reach the imaging sensor would allow either: better resolution or a decreased incident angle. FIG. 11 illustrates an embodiment of a remote displacement monitoring system using a lens element 1104 to improve resolution. One of two laser beam sources 1102 is illustrated as emitting a first laser beam 1109 that reflects off the fluid surface at a first elevation 1106 as a first reflected laser beam 1110 (the second laser source is not illustrated in order to simplify the illustration. The first reflected laser beam 1110 exits the furnace (not illustrated) and passes through a convex lens element 1104 en route to an imaging sensor 1128. The path of the first reflected laser beam 1110 is altered by the lens element 1104.

Subsequently, the laser beam source 1102 emits a second laser beam 1111 that reflects off the fluid surface at a lower elevation 1108, generating a second reflected laser beam 1112 that exits the furnace and passes through the convex lens element 1104. The path of the second reflected laser beam 1112 is altered by the lens element 1104. However, the second reflected laser beam 1112 is altered to a greater extent than the first reflected laser beam 1110, causing a distance 1130 between the detected positions of the first and second reflected laser beams 1110, 1112 on the imaging sensor 1128 to be greater than a distance 1132 between the first and second laser beams 1110, 1112 before they enter the lens element 1104.

One of skill in the art will recognize that the first and second laser beams 1109, 1111 can be one continuous wave laser beam, or two separate pulses. In either case, the source and beam direction are the same; the reference to a first and second beam was merely used to help delineate the path 1109 at a first time and path 1111 at a subsequent time.

Along a similar line, one or more lens elements may be placed in the paths of the reflected laser beams in order to focus the beams onto the imaging sensor and thus improve resolution. Ideally, without any lensing elements, the beams would be focused at the imaging sensor, however there may be factors that would favor the use of a lensing element for focusing the beams on the imaging sensor. For instance, when a divergent lens element 1104 such as that illustrated in FIG. 11 is used, one focusing lens element for each reflected beam may be placed between the lens element 1104 and the imaging sensor 1128 to refocus the reflected beams after the defocusing effects of the lens element 1104.

While the use of two beams alleviates inaccuracies due to alignment and system vibrations, a number of other aspects of the disclosure improve resolution or an accuracy of determining the reflected laser positions on the imaging sensor. These can include any one or more of the following: (A) a one-dimensional imaging sensor, (B) spreading the laser beams into elongated cross sections aligned perpendicular to the one-dimensional sensor's length (C), pulsing the laser sources and using discrete imaging sensor integration periods, and (D) filtering the radiation incident on the imaging sensor.

One-Dimensional Imaging Sensor

Figure 7:
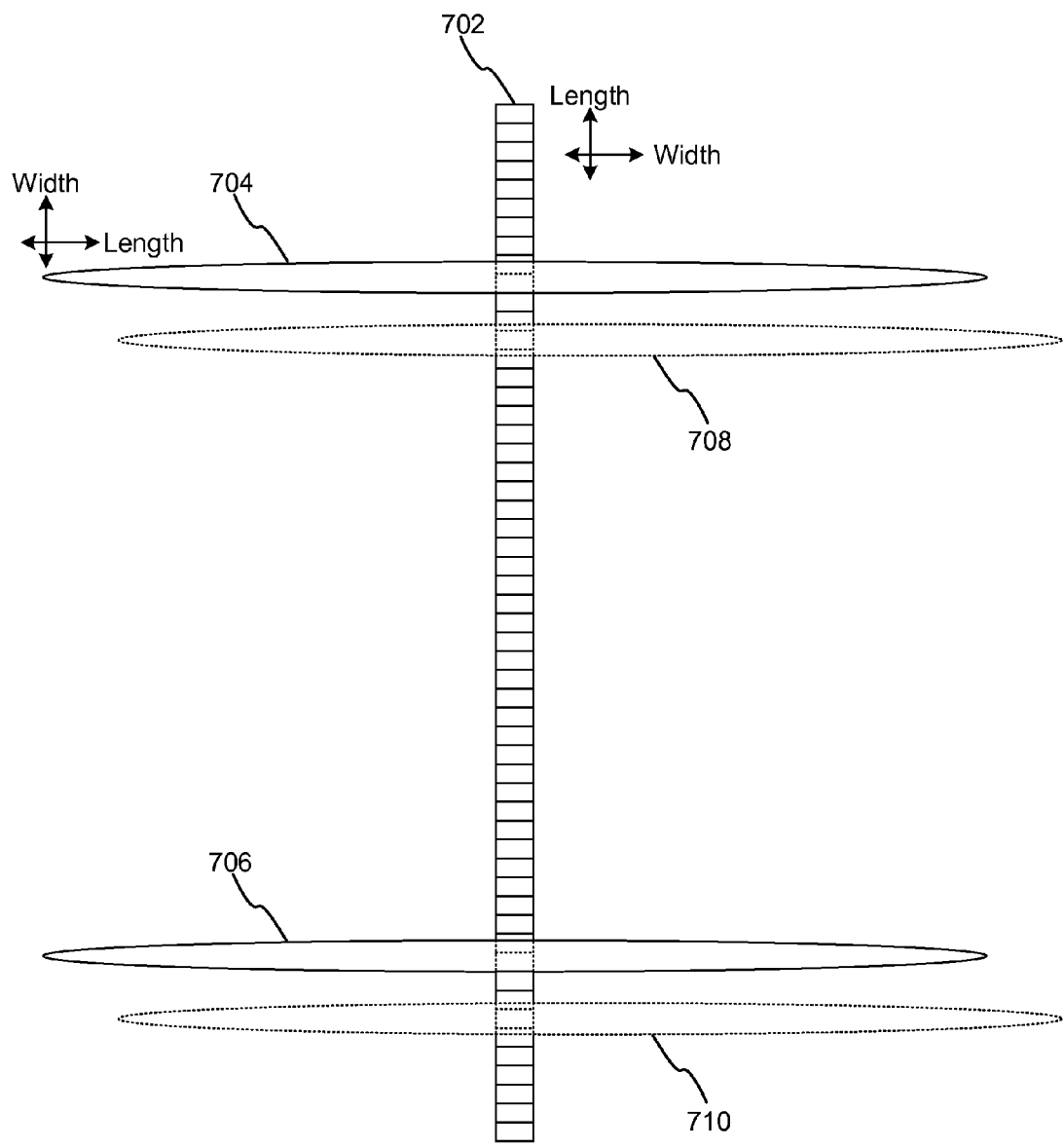
FIG. 7 illustrates one embodiment of a one-dimensional imaging sensor with two elongated reflected laser beams incident on the one-dimensional imaging sensor.

FIG. 7 illustrates one embodiment of a one-dimensional imaging sensor 702 with two elongated reflected laser beams 704, 706 incident on the one-dimensional imaging sensor 702. The one-dimensional imaging sensor 702 has a plurality of pixels arranged in a single line such that each pixel is adjacent to only two other pixels (except each pixel on the ends, which are only adjacent to a single pixel). A line scanner, such as found in a fax machine, scanner, or copier, is one non-limiting example of a one-dimensional imaging sensor.

One advantage of a one-dimensional imaging sensor 702 is that the refresh rate for each pixel can be significantly faster than is possible with a similar-cost two-dimensional imaging sensor. For instance, where a typical two-dimensional imaging sensor can achieve a 70 Hz data acquisition rate, the one-dimensional imaging sensor 702 can acquire data at 1 kHz. This increased acquisition rate decreases blurring that an incident laser beam could undergo if movement of the incident position of the laser were faster than the imaging sensor acquisition rate. In other words, if the laser beam position moves during a single detection integration period, then the position will be blurred. Use of a one-dimensional imaging sensor also reduces the software, programming, and processing time associated with reading, recording, and analyzing the data from the imaging sensor.

The one-dimensional imaging sensor 702 has not been used in this context previously because of movements in the reflected laser beams 704, 706 which would typically cause the beams 704, 706 to jitter on and off of the one-dimensional imaging sensor 702. For instance, disturbances in the fluid surface often cause the reflected beams to jump around rather than stay in a single spot. While the use of two beams at least alleviates the problem of such jitters in one direction (e.g., up and down in FIG. 7), it would not alleviate the problem relative to a one-dimensional sensor 702 when the jitter was perpendicular to the length of the sensor 702. However, use of laser beams with elongated cross sections 704, 706 (e.g., a length is substantially greater than a width) arranged perpendicular to the length of the one-dimensional sensor 702 enables some portion of the reflected laser beams 704, 706 to always be incident on a portion of the one-dimensional imaging sensor 702.

The third and fourth elongated reflected laser beams 708, 710 (dotted lines) illustrate a new position of the first and second elongated reflected laser beams 704, 706 if vibration in the system or misalignment caused the beams to move relative to the one-dimensional imaging sensor 702 even where no change in the fluid surface level occurs. As seen, the distance between the two reflected laser beams 708, 710 remains the same, and even though they both moved off a center axis coincident with the one-dimensional imaging sensor, a portion of both beams 708, 710 is still incident on the imaging sensor 702 and thus still detected. This unique combination of a one-dimensional imaging sensor 702 and elongated laser beam cross sections arranged perpendicular to the length of the one-dimensional imaging sensor 702 enables fast, sharp, and uninterrupted reflected laser beam position detection.

Line scan imagers that are two-dimensional can also be implemented where the number of pixels in a length dimension is substantially greater than a number of pixels in a width dimension. Such two-dimensional line scan imagers also preferably have an acquisition rate closer to 1 kHz than to 70 Hz.

Elongated Laser Beam Cross Section

As illustrated in FIG. 7, the laser beams can have an elongated cross section, meaning that a length is substantially greater than the width. In some instances, the cross section may appear elliptical as in FIG. 7. However, other elongated cross sections may appear more rectangular. This exact shape is not limited to either of the above. More importantly is that the length be sufficient to allow a portion of the reflected laser beams to be detected by the one-dimensional imaging sensor 702 when the reflected beams move or vibrate relative to the one-dimensional imaging sensor 702.

The elongation can be generated from any laser source, such as one having a circular or elliptical cross section. Elongation can be formed by passing a laser beam through a tubular lens (from the flat to the convex side) thus causing the circular or elliptical cross section to spread into an elliptical cross section having substantially greater length than width. Elongation can also be created via fixed mirrors or other types or combinations or lenses. Alternatively, the elongation can be formed via the use of dynamic mirrors or lenses to distort the original cross section via a scanning method. For instance, a small vibrating mirror could scan a circular laser beam cross section across a linear path thus creating an elongated beam cross section when viewed in a time-averaged fashion.

Although the above paragraphs have described an elongated laser beam cross section, one of skill in the art will recognize that this feature is not limiting and that many of the herein disclosed embodiments can operate without with a circular or elliptical (but non-elongated) cross section.

Discontinuous (or Pulsed) Laser Sources and Imaging Sensor Detection Integration Period One challenge in remote fluid displacement measurements is that the reflected laser beams have very narrow beam cross sections—a result of the specular-type reflections from the smooth fluid surface. Diffuse reflections would mean that light would continue to impact the same spot even where the surface sees a disturbance or there is vibration or misalignment in the system. However, with specular reflection, any of these movements can cause the reflected beams to move around the imaging sensor, or off the imaging sensor. Such movements are amplified by the long distances over which remote displacement measurements of fluid are made (e.g., ~1.5 meters). Thus, continuous wave laser sources in combination with continuously integrating detection schemes for the imaging sensor can lead to blurring of the detected beams. The herein proposed solution includes using either or both of pulsed laser sources or an imaging sensor using a discontinuous detection integration period to avoid blurring.

Figure 8A:
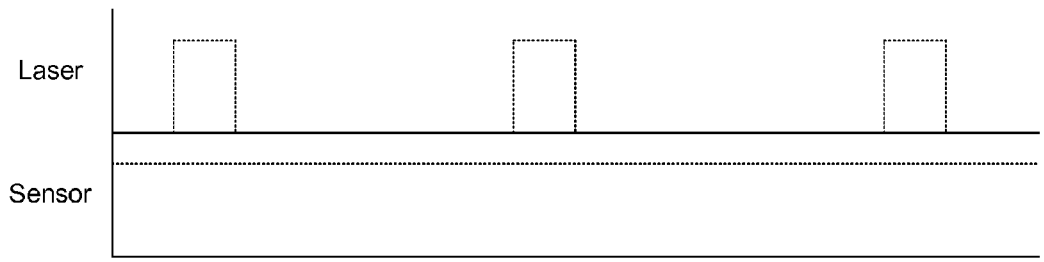
FIG. 8A illustrates a pulsed laser source in combination with a continuously integrating detection scheme for the imaging sensor.

FIG. 8A illustrates a pulsed laser source in combination with a continuously integrating detection scheme for the imaging sensor. When the laser is pulsed fast enough (e.g., 10 microseconds), even if moving across the imaging sensor, there will only be enough time for a non-blurred image of the laser beam cross section to be detected by the imaging sensor. Hence, fast laser pulses can avoid blurring.

Figure 8B:
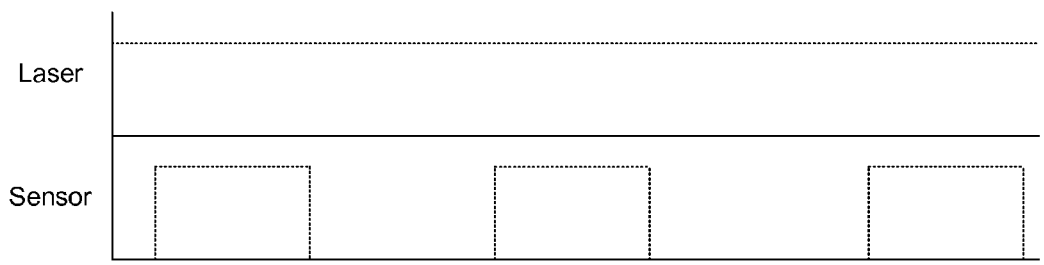
FIG. 8B illustrates a continuous wave laser source in combination with a discontinuous detection integration scheme.

Discontinuous detection can also decrease blurring. In FIG. 8B even though the laser is operated in continuous wave mode, the discontinuous detection integration period of the imaging sensor (e.g., ~100 microseconds) means that only movement of the laser beams during the discontinuous detection integration period will be detected, and thus blurring will be less pronounced.

Figure 8C:
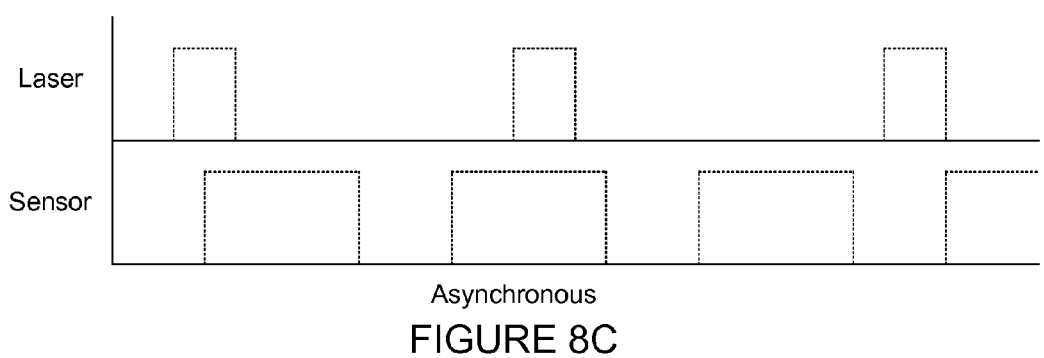
FIG. 8C illustrates pulsed laser sources asynchronously aligned with an imaging sensor operating in a discontinuous detection integration scheme.
Figure 8D:
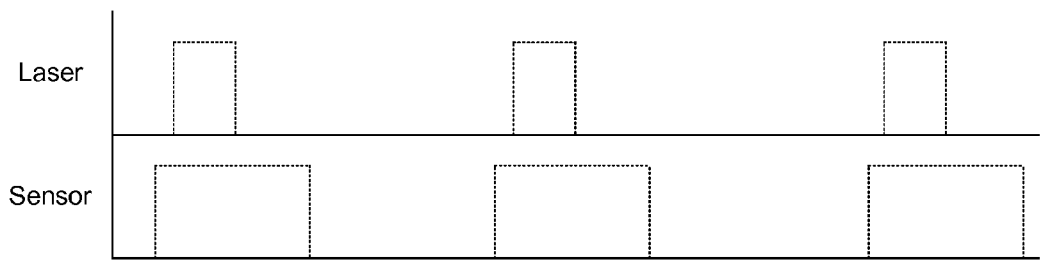
FIG. 8D illustrates one embodiment of a timing pattern for a pulsed laser operated synchronously with a discontinuous detection integration scheme.

In some embodiments, pulsed laser sources and discontinuous detection integration can be combined, as for instance in FIGS. 8C and 8D. FIG. 8C illustrates pulsed laser sources asynchronously aligned with an imaging sensor operating in a discontinuous detection integration scheme. As in FIG. 8A, blurring of the detected laser beam positions can be reduced. Asynchronous operation is advantage since less configuration, programming, and sophisticated components are required to carry out this mode.

However, if synchronous operation between the laser beams and the imaging sensor is preferred, then FIG. 8D illustrates one of many synchronous timing patterns. In the synchronous and asynchronous timing patterns of FIGS. 8C and 8D, the detection integration period of the imaging sensor (e.g., ~100 microseconds) is preferably shorter than the period of the laser pulses (e.g., >100 microseconds) so that a single detection integration period does not pick up light from two consecutive pulses.

These timing charts are applicable to both one-dimensional and two-dimensional imaging sensors. Although the above paragraphs have described use of pulsed laser beams, one of skill in the art will recognize that this feature is not limiting and that many of the herein disclosed embodiments can operate with continuous wave laser sources. Furthermore, pulsed laser sources can have a variety of characteristics such as varying duty cycles and power, to name just two.

Filtering

Returning to FIG. 3, fluid typically melts at 2030-2050° C., and thus the fluid 306a emits large amounts of blackbody radiation that can drown out the reflected laser beams if not handled. One way to improve the signal-to-noise (SN) ratio is to operate at wavelengths where there is less blackbody radiation from the fluid 306a. This occurs towards the blue or violet end of the visible spectrum and thus in some embodiments, blue or violet lasers can be used. In particular, wavelengths less than 500 nm can be used, or less than 450 nm. In one embodiment, the laser sources 322, 324, emits light at a wavelength of 405 nm.

Additionally, blackbody emissions near these wavelengths tend to be diffuse rather than specular. As such, a much smaller percentage of the blackbody emissions reach the imaging sensor than do photons from the specular reflection of the laser beams. Thus, the difference between diffuse emissions and specular reflections leads to further increase in the SN ratio.

The SN ratio can be further improved via the use of filters to reduce all but blue or violet photons from reaching the imaging sensor. In one embodiment a series of filters can be arranged so as to reduce the amount of emissions that reach the imaging sensor surrounding the lasing wavelength. For instance, a violet bandpass filter (e.g., 400 nm) in series with a blue and green bandpass (e.g., BG37 Schott Glass for absorbing red and IR wavelengths) in series with a violet bandpass (e.g., B390 Hoya glass to absorb green and blue wavelengths) can be used to filter all but violet photons.

Normalization for Fluid Surface Disturbances

Another challenge is that disturbances in the fluid surface can cause the two reflected laser beams to move relative to each other even where the surface elevation remains the same. To account for these surface disturbances, a distance between the detected laser beams can be monitored for a plurality of laser pulses (e.g., 1000 pulses) over a period of time, and an average distance can be determined. By averaging, variations between the positions caused by disturbances in the fluid surface can be diminished. This procedure also provides data describing the surface disturbance characteristics and motion as well as a curvature dynamic for the fluid surface.

In the various herein disclosed embodiments, applications include any remote displacement sensing of a fluid surface, especially where contact measurements are not possible. For instance, these embodiments are especially suited where a fluid surface exists in a thermally or chemically hostile environment. Some non-limiting examples include remote displacement measurements of fluid surfaces such as fluids comprising sapphire, silicon, silicon carbide, and glass, and molten version thereof, to name just a few.

In some embodiments, a dimension of the cross section of the reflected laser beams can be measured to supplement or replace the measurements of distance between the reflected laser beams. For instance, a width or diameter of either or both reflected laser beams could be measured, and changes over time used to roughly determine displacement of a fluid surface (e.g., a larger radius might means the surface elevation has decreased, but this depends on whether the minimum collimation point of the laser beam is in front or behind the imaging sensor).

In one embodiment, the systems, methods, and apparatus herein disclosed can be modified for dynamic range finding applications. The incident angle of the first and second laser sources can be swept through a range of angles during a time period, with such sweeps occurring at up to 1000 cycles per second (1 kHz). For each incident angle, the positions of the reflected laser beams off a remote surface can be detected by an imaging sensor. A processor can use the incident angles and reflected laser beam positions to determine a distance between the first and second laser sources and the remote surface. The processor can further determine changes in the position of the surface at multiple points in time and even a rate of change in position. One advantage of this dynamic method of range finding is that large displacements in the surface can be observed and calculated.

Figure 9:
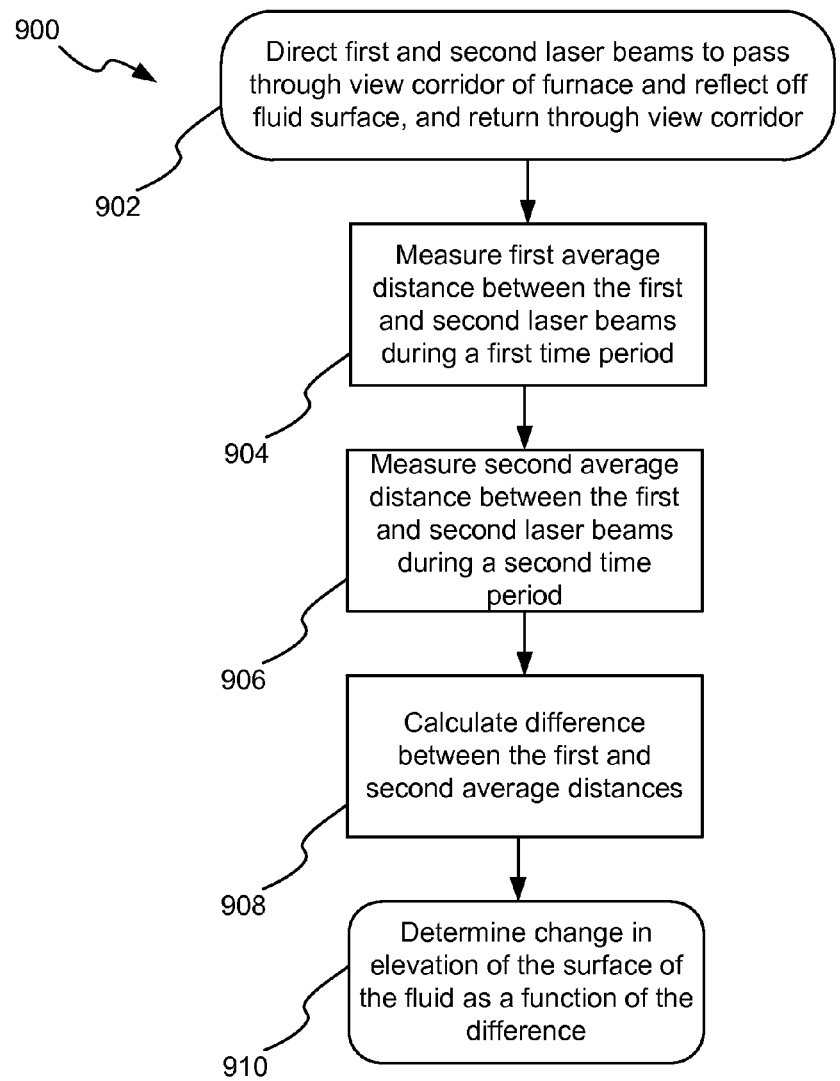
FIG. 9 illustrates a method of making remote displacement measurements of a fluid surface.

FIG. 9 illustrates a method 900 of making remote displacement measurements of a fluid surface. The method 900 includes a direct first and second laser beams operation 902 in which first and second laser beams are directed to pass through a view corridor of a furnace and reflect off the fluid surface within. The beams are arranged such that their reflections leave the furnace and are detected on an imaging sensor. This occurs via two measuring operations 904 and 906. In the first measuring operation 904, the imaging sensor measures a first average distance between the first and second laser beams during a first time period. The average distance can be measured by averaging the positions of the first and second laser beams over a period of time or over a number of laser pulses (e.g., 1000 pulses). In the second measuring operation 906, the imaging sensor measures a second average distance between the first and second laser beams during a second time period. This data can then pass to a processor which calculates a difference between the first and second average distances in a calculate operation 908. Based on this difference, the processor can determine a change in elevation of the fluid surface as a function of the difference in a determine operation 910.

Figure 10:
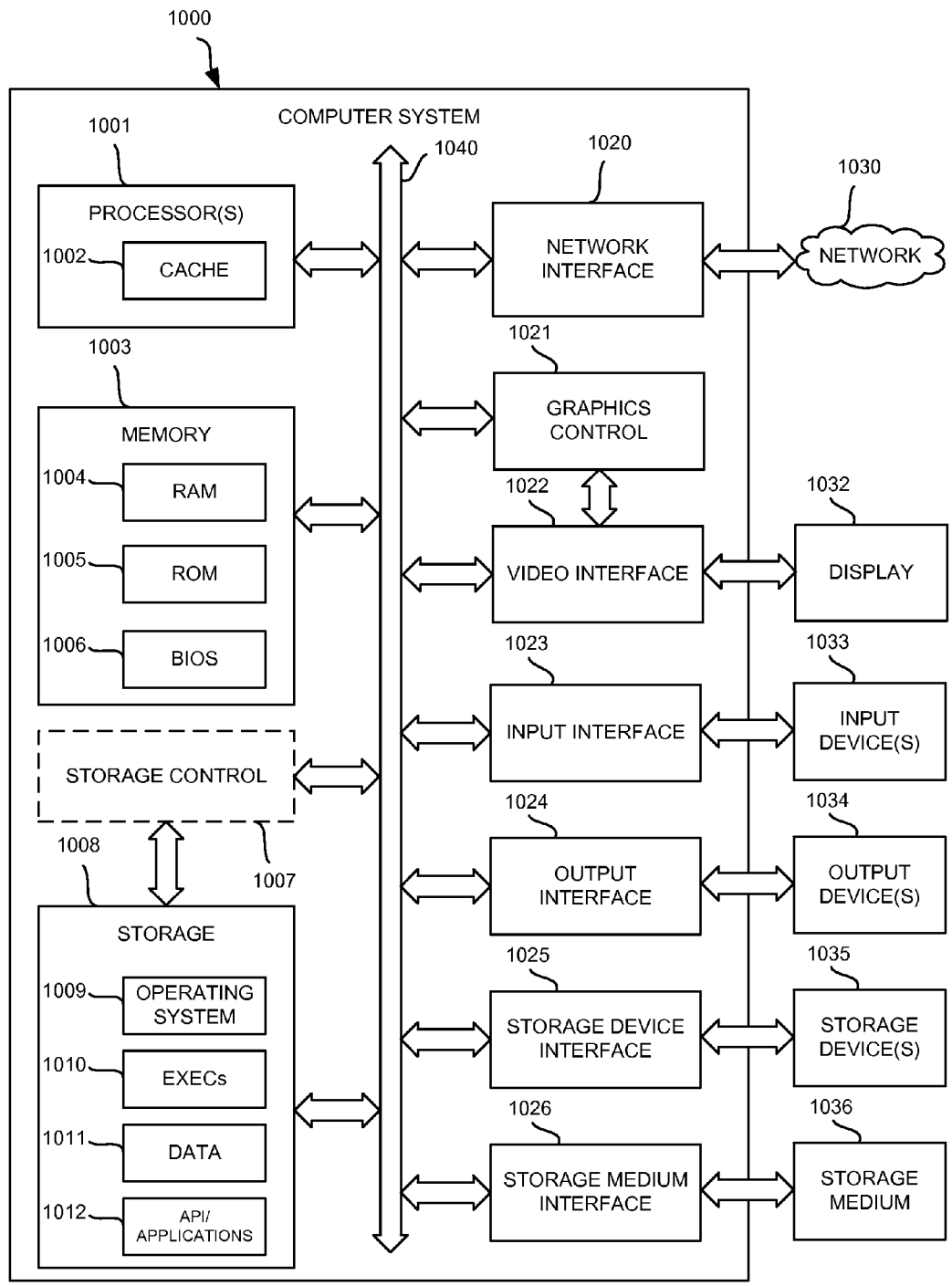
FIG. 10 shows a diagrammatic representation of one embodiment of a machine in the exemplary form of a computer system within which a set of instructions can execute for causing a device to perform or execute any one or more of the aspects and/or methodologies of the present disclosure.

Portions of the systems and methods described herein can be implemented in a machine such as a computer system in addition to the specific physical devices described herein. FIG. 10 shows a diagrammatic representation of one embodiment of a machine in the exemplary form of a computer system 1000 within which a set of instructions can execute for causing a device to perform or execute any one or more of the aspects and/or methodologies of the present disclosure. The components in FIG. 10 are examples only and do not limit the scope of use or functionality of any hardware, software, embedded logic component, or a combination of two or more such components implementing particular embodiments.

Computer system 1000 may include a processor 1001, a memory 1003, and a storage 1008 that communicate with each other, and with other components, via a bus 1040. The bus 1040 may also link a display 1032, one or more input devices 1033 (which may, for example, include a keypad, a keyboard, a mouse, a stylus, an imaging sensor, etc.), one or more output devices 1034 (e.g., one or more laser sources such as 332 and 324), one or more storage devices 1035, and various tangible storage media 1036. All of these elements may interface directly or via one or more interfaces or adaptors to the bus 1040. For instance, the various tangible storage media 1036 can interface with the bus 1040 via storage medium interface 1026. Computer system 1000 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 1001 (or central processing unit(s) (CPU(s))) optionally contains a cache memory unit 1002 for temporary local storage of instructions, data, or computer addresses. In one instance, the cache memory unit 1002 can store instructions for controlling a pulse width and periodicity of one or more laser sources (e.g., 332, 324, 520, 522, 602, 604) and a detection integration length and period of an imaging sensor (e.g., 326, 524, 628, 702, 1128). The cache memory unit 1002 can also store data describing a position of one or more reflected laser beams (e.g., 630, 632, 634, 636) detected by an imaging sensor (e.g., 326, 524, 628, 702, 1128). The cache memory unit 1002 can also store data describing a distance (e.g., 328a, 328b, 526a, 526b, 624, 622) between reflected laser beam positions (e.g., 630, 632, 634, 636), and/or a change in distance between reflected laser beam positions (e.g., 630, 632, 634, 636) as a function of time. Processor(s) 1001 are configured to assist in execution of computer readable instructions. Computer system 1000 may provide functionality as a result of the processor(s) 1001 executing software embodied in one or more tangible computer-readable storage media, such as memory 1003, storage 1008, storage devices 1035, and/or storage medium 1036. The computer-readable media may store software that implements particular embodiments, and processor(s) 1001 may execute the software. Memory 1003 may read the software from one or more other computer-readable media (such as mass storage device(s) 1035, 1036) or from one or more other sources through a suitable interface, such as network interface 1020. The software may cause processor(s) 1001 to carry out one or more processes or one or more steps of one or more processes described or illustrated herein. For instance, the software may cause processor(s) 1001 to instruct one or more laser sources to project pulsed laser beams towards a surface of a liquid or to instruct an imaging sensor to detect positions of one or more reflected laser beams. Carrying out such processes or steps may include defining data structures stored in memory 1003 and modifying the data structures as directed by the software.

The memory 1003 may include various components (e.g., machine readable media) including, but not limited to, a random access memory component (e.g., RAM 1004) (e.g., a static RAM "SRAM", a dynamic RAM "DRAM", etc.), a read-only component (e.g., ROM 1005), and any combinations thereof. ROM 1005 may act to communicate data and instructions unidirectionally to processor(s) 1001, and RAM 1004 may act to communicate data and instructions bidirectionally with processor(s) 1001. ROM 1005 and RAM 1004 may include any suitable tangible computer-readable media described below. In one example, a basic input/output system 1006 (BIOS), including basic routines that help to transfer information between elements within computer system 1000, such as during start-up, may be stored in the memory 1003. In some embodiments, the memory 1003 may store processor-executable instructions executed by the processor(s) 1001 for carrying out any one or more method steps as illustrated in FIG. 9. The memory may also store processor-executable instructions for controlling a pulse width and periodicity of one or more laser sources (e.g., 332, 324, 520, 522, 602, 604) and a detection integration length and period of an imaging sensor (e.g., 326, 524, 628, 702, 1128). The memory 103 can also store data describing a position of one or more reflected laser beams (e.g., 630, 632, 634, 636) detected by an imaging sensor (e.g., 326, 524, 628, 702, 1128) and/or data describing a distance between reflected laser beam positions (e.g., 630, 632, 634, 636), and/or a change in distance between reflected laser beam positions (e.g., 630, 632, 634, 636) as a function of time Fixed storage 1008 is connected bidirectionally to processor(s) 1001, optionally through storage control unit 1007. Fixed storage 1008 provides additional data storage capacity and may also include any suitable tangible computer-readable media described herein. Storage 1008 may be used to store operating system 1009, EXECs 1010 (executables), data 1011, API applications 1012 (application programs), and the like. Often, although not always, storage 1008 is a secondary storage medium (such as a hard disk) that is slower than primary storage (e.g., memory 1003). Storage 1008 can also include an optical disk drive, a solid-state memory device (e.g., flash-based systems), or a combination of any of the above. Information in storage 1008 may, in appropriate cases, be incorporated as virtual memory in memory 1003.

In one example, storage device(s) 1035 may be removably interfaced with computer system 1000 (e.g., via an external port connector (not shown)) via a storage device interface 1025. Particularly, storage device(s) 1035 and an associated machine-readable medium may provide nonvolatile and/or volatile storage of machine-readable instructions, data structures, program modules, and/or other data for the computer system 1000. In one example, software may reside, completely or partially, within a machine-readable medium on storage device(s) 1035. In another example, software may reside, completely or partially, within processor(s) 1001.

Bus 1040 connects a wide variety of subsystems. Herein, reference to a bus may encompass one or more digital signal lines serving a common function, where appropriate. Bus 1040 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1000 may also include an input device 1033. Input device 1033 can be embodied, for instance, in a keypad, keyboard, mouse, stylus, imaging sensor (e.g., 326, 524, 628, 702, 1128), or a CCD, to name a few non-limiting examples. In one example, a user of computer system 1000 may enter commands and/or other information into computer system 1000 via input device(s) 1033. Examples of an input device(s) 1033 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera, CCD, one-dimensional imaging sensor, two-dimensional imaging sensor), and any combinations thereof. Input device(s) 1033 may be interfaced to bus 1040 via any of a variety of input interfaces 1023 (e.g., input interface 1023) including, but not limited to, serial, parallel, game port, USB, FIREWIRE, THUNDERBOLT, or any combination of the above.

In particular embodiments, when computer system 1000 is connected to network 1030, computer system 1000 may communicate with other devices, specifically mobile devices and enterprise systems, connected to network 1030. Communications to and from computer system 1000 may be sent through network interface 1020. For example, network interface 1020 may receive incoming communications (such as requests or responses from other devices) in the form of one or more packets (such as Internet Protocol (IP) packets) from network 1030, and computer system 1000 may store the incoming communications in memory 1003 for processing. Computer system 1000 may similarly store outgoing communications (such as requests or responses to other devices) in the form of one or more packets in memory 1003 and communicated to network 1030 from network interface 1020. In an embodiment, instructions to a remote displacement monitoring system (e.g., 320) can be passed via the network 1030 and data from the system can be passed back to a remote server or user via the network 1030. Processor(s) 1001 may access these communication packets stored in memory 1003 for processing.

Examples of the network interface 1020 include, but are not limited to, a network interface card, a modem, and any combination thereof. Examples of a network 1030 or network segment 1030 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 1030, may employ a wired and/or a wireless mode of communication. In general, any network topology may be used.

Information and data can be displayed through a display 1032. For instance, a fluid surface elevation can be displayed in text, graphics, or a chart to a user via the display 1032. Parameters of a measurement system, such as laser pulse duration, laser pulse duty cycle, and detection integration period of an imaging sensor (e.g., 326, 524, 628, 702, 1128), can be displayed to a user via display 1032. Examples of a display 1032 include, but are not limited to, a liquid crystal display (LCD), an organic liquid crystal display (OLED), a cathode ray tube (CRT), a plasma display, and any combinations thereof. The display 1032 can interface to the processor(s) 1001, memory 1003, and fixed storage 1008, as well as other devices, such as input device(s) 1033, via the bus 1040. The display 1032 is linked to the bus 1040 via a video interface 1022, and transport of data between the display 1032 and the bus 1040 can be controlled via the graphics control 1021.

In addition to a display 1032, computer system 1000 may include one or more other peripheral output devices 1034 including, but not limited to, an audio speaker, a printer, laser sources (e.g., 332, 324, 520, 522, 602, 604) and any combinations thereof. Such peripheral output devices may be connected to the bus 1040 via an output interface 1024. Examples of an output interface 1024 include, but are not limited to, a serial port, a parallel connection, a USB port, a FIREWIRE port, a THUNDERBOLT port, and any combinations thereof.

In addition or as an alternative, computer system 1000 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

In some embodiments, the processor 1001 (e.g., 330) can monitor the positions of the first and second laser beams and determine distances between them (e.g., 328a, 328b, 526a, 526b, 620, 622). It may also determine average distances between the beams. The processor 1001 can also calculate a change in average distance between the beams (e.g., 528, 624) as a function of time and use this change to calculate a change in elevation (e.g., 332, 626) of a surface of a fluid. The processor 1001 can also use algorithms to normalize for disturbances in a fluid surface.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For instance, in some cases changes in the reflected laser beam positions on the imaging sensor can be used along with a calibration to determine an absolute fluid surface elevation. In other cases, two or more imaging sensors can be used to each monitor both beam positions or each imaging sensor can monitor one of the two beam positions. Thus, the present invention is not intended to be limited to the embodiments shown herein but is to be accorded the widest scope consistent with the principles and novel features disclosed herein.

What is claimed is:

1. A remote displacement sensing system for fluid level measurement, the system comprising:
    a one-dimensional imaging sensor;
    a first laser source directed to a fluid surface within a furnace such that a first reflected beam is detected by the one-dimensional imaging sensor at a first position;
    a second laser source directed to the fluid surface within the furnace such that a second reflected beam is detected by the one-dimensional imaging sensor at a second position; and
    a processor configured to monitor a distance between the first and second positions and to calculate a change in a level of the fluid based on a change in the distance between the first and second positions,
    wherein from a viewpoint perpendicular to a plane passing vertically through the one-dimensional imaging sensor, the first and second reflected beams intersect.

2. The remote displacement sensing system of claim 1, wherein the first laser source and the second laser source produce beams having cross sections with substantially greater length than width.

3. The remote displacement sensing system of claim 2, wherein a length of the beam cross sections of the first and second laser sources is perpendicular to the one-dimensional imaging sensor.

4. The remote displacement sensing system of claim 1, wherein the first and second laser sources are synchronously pulsed, and maintained in an on state for a same pulse length.

5. The remote displacement sensing system of claim 4, wherein the one-dimensional imaging sensor has a detection integration period longer than the pulse length.

6. The remote displacement sensing system of claim 5, wherein the one-dimensional imaging sensor is pulsed asynchronously with the first and second laser sources.

7. The remote displacement sensing system of claim 1, wherein one or more filters in series between the fluid surface and the one-dimensional imaging sensor have a bandpass including 450 or 500 nanometer wavelengths.

8. The remote displacement sensing system of claim 1, wherein the one-dimensional imaging sensor has a faster data acquisition rate than a two-dimensional imaging sensor.

9. The remote displacement sensing system of claim 1, wherein the first and second laser sources operate below a 500 nanometer wavelength.

10. The remote displacement sensing system of claim 9, wherein the first and second laser sources operate below a 450 nanometer wavelength.

11. The remote displacement sensing system of claim 1, wherein the processor is configured to calculate a change in the level, $\Delta_{626}$, of the fluid based on the following equation:

$$\Delta_{626} = \frac{x_2 - x_1}{4\tan(\emptyset)}$$

where $x_2-x_1$ is the change in the distance between the first and second positions and $\emptyset$ is an angle between either of the first or second laser sources and the fluid surface when undisturbed.

12. The remote displacement sensing system of claim 11, wherein the angle $\theta$ is between 0.5° and 1.5°.

13. The remote displacement sensing system of claim 1, wherein the fluid is selected from the group consisting of: sapphire, silicon, silicon carbide, and glass.

14. A method of performing remote displacement sensing of a fluid surface, the method comprising:
  directing a first laser beam to pass through a view corridor of a furnace, reflect off a fluid surface inside the furnace, and return through the view corridor;
  directing a second laser beam to pass through the view corridor of the furnace, reflect off the fluid surface of the inside of the furnace, and return through the view corridor;
  measuring, via at least one imaging sensor, a first average distance between the first and second laser beams during a first time period;
  measuring, via the at least one imaging sensor, a second average distance between the first and second laser beams during a second time period;
  calculating, via a processor, a difference between the first and second average distances; and
  determining, via the processor, a change in elevation of the fluid surface as a function of the difference,
  wherein from a viewpoint perpendicular to a plane passing vertically through the imaging sensor, the first and second laser beams cross.

15. The method of performing remote displacement sensing of a fluid surface of claim 14, wherein the view corridor is at least 1 meter from the fluid surface.

16. The method of performing remote displacement sensing of a fluid surface of claim 15, wherein an angle of incidence of the first laser beam on the fluid surface is less than 1.5°.

17. The method of performing remote displacement sensing of a fluid surface of claim 16, wherein an angle of incidence of the first laser beam on the fluid surface is between 0.5° and 1.5°.

18. The method of performing remote displacement sensing of a fluid surface of claim 14, wherein a resolution of the change in elevation increases with increasing angle of incidence.

19. The method of performing remote displacement sensing of a fluid surface of claim 14, further comprising synchronously pulsing the first and second laser beams.

20. The method of performing remote displacement sensing of a fluid surface of claim 19, wherein the measuring is periodically performed for discrete periods of time.

21. The method of performing remote displacement sensing of a fluid surface of claim 20, wherein the pulsing has a shorter duty cycle than the measuring.

22. The method of performing remote displacement sensing of a fluid surface of claim 21, wherein the measuring and the pulsing are asynchronous.

23. The method of performing remote displacement sensing of a fluid surface of claim 14, wherein the imaging sensor is one-dimensional.

24. The method of performing remote displacement sensing of a fluid surface of claim 14, wherein the first and second laser beams have cross sections with substantially greater length than width.

25. The method of performing remote displacement sensing of a fluid surface of claim 24, wherein the first and second laser beam cross sections are parallel.

26. The method of performing remote displacement sensing of a fluid surface of claim 25, wherein the length dimension of each of the first and second laser beams is substantially perpendicular to a length of a one-dimensional imagining sensor, where the imaging sensor enables the first and second measuring.

27. The method of performing remote displacement sensing of a fluid surface of claim 14, wherein a reflection of the first and second laser beams off the fluid surface is primarily specular.

28. A remote displacement sensing system comprising:
  an imaging sensor having a discontinuous detection integration period, and a first duty cycle;
  a first pulsed laser source directed to a fluid surface within a furnace such that a first reflected beam is detected by the imaging sensor at a first position, wherein pulses of the first pulsed laser source have a duty cycle shorter than the first duty cycle such that blurring of the first position on the imaging sensor is reduced;
  a second pulsed laser source directed to the fluid surface within the furnace such that a second reflected beam is detected by the imaging sensor at a second position, wherein the pulses of the second pulsed laser source have a duty cycle shorter than the first duty cycle such that blurring of the second position on the imaging sensor is reduced; and a processor configured to monitor a distance between the first and second positions and to calculate a level of the fluid based on the distance between the first and second positions.

29. A non-transitory, tangible computer readable storage medium, encoded with processor readable instructions to perform a method for remotely measuring a vertical displacement of a surface of fluid, the method comprising: detecting a first position of a first reflected laser beam at a first time; detecting a second position of a second reflected laser beam at the first time; calculating a first distance between the first and second positions; detecting a third position of the first reflected laser beam at a second time; detecting a fourth position of the second reflected laser beam at the second time; calculating a second distance between the third and fourth positions; calculating a change in reflected laser beam separation as the second distance minus the first distance; and calculating the vertical displacement of the surface of the fluid as the change in reflected laser beam separation divided by four times a tangent of an incident angle of either of the first or second laser beams, wherein, from a viewpoint perpendicular to a vertical plane comprising the first and second positions, the first and second reflected laser beams intersect.

* * * * *